United States Patent Office 3,112,123
Patented Nov. 26, 1963

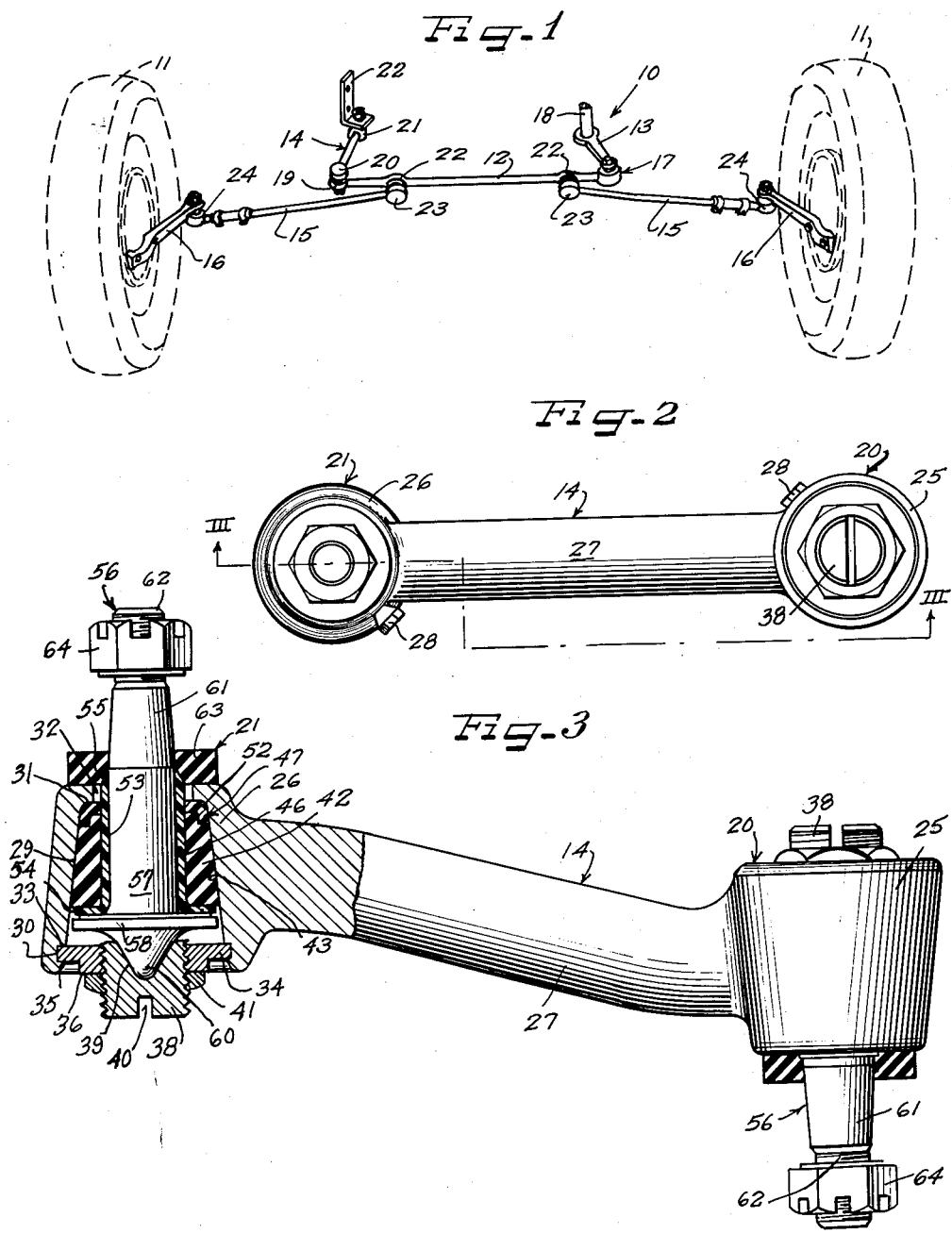

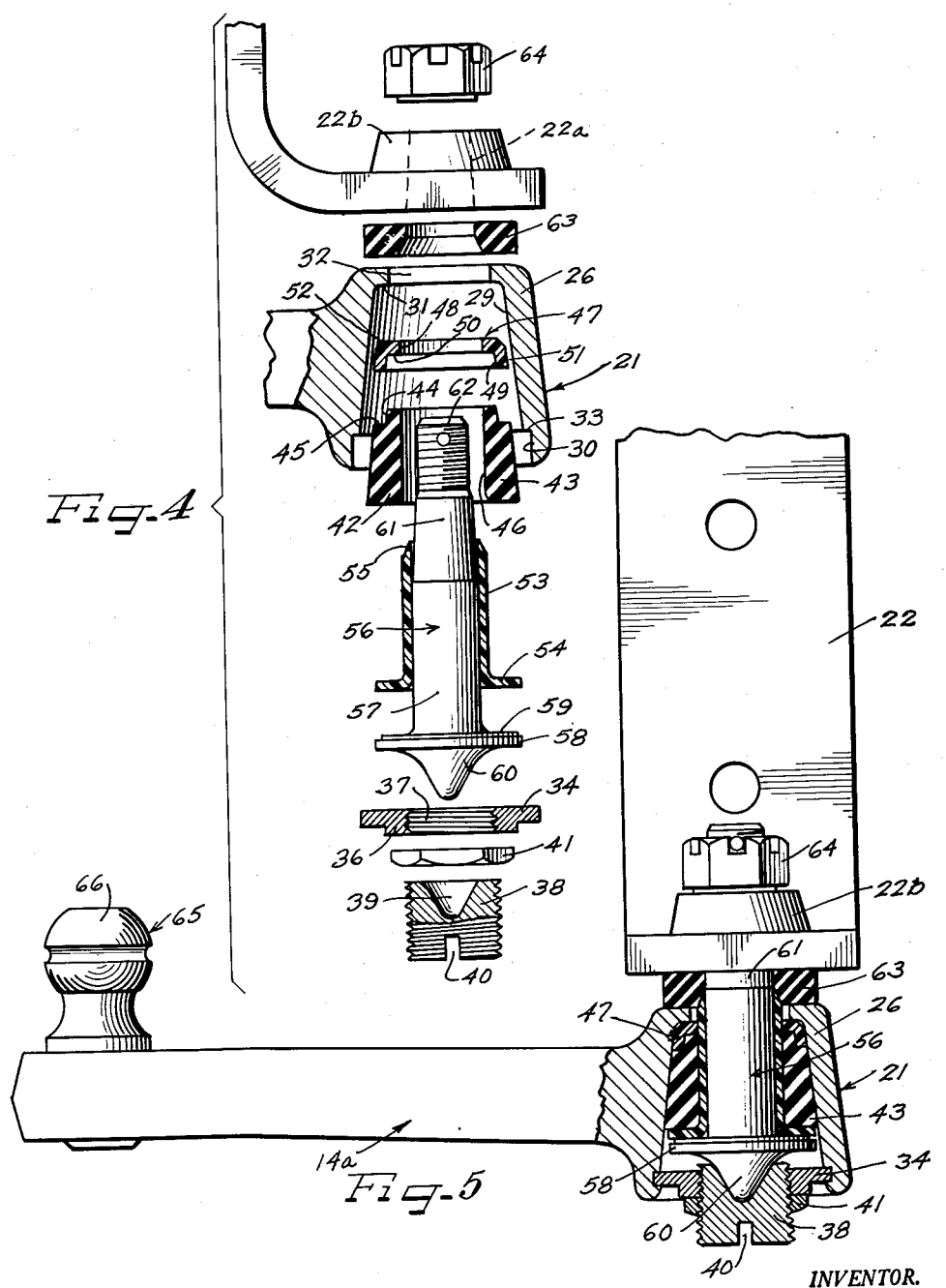

3,112,123
ADJUSTABLE JOINT AND IDLER ARM FOR VEHICLE STEERING LINKAGES
Donovan B. True, Mentor, Ohio, assignor to Thompson Ramo Wooldridge Inc., Cleveland, Ohio, a corporation of Ohio
Filed Mar. 22, 1962, Ser. No. 181,691
9 Claims. (Cl. 280—95)

This invention relates to an adjustable pin joint for idler arms and the like to selectively control the turning resistance of steering linkages. More specifically this invention relates to an automobile steering linkage idler arm adapted to adjustably control the turning resistance in an automobile steering linkage while resisting undesired angular movement under normal loads but accommodating such angular movement under heavy loads so as to prevent damage to the linkage.

In cross link or parallelogram steering linkages of automotive vehicles the center link or cross link is shifted longitudinally by a pitman arm coupled to one end thereof and is connected to the automobile frame at the other end thereof by an idler arm. Tie rods connect the center link with the steering arms of the wheels so that this longitudinal shifting of the center link is translated into turning movement of the wheels to effect steering. Since the steer-wheels are spring-suspended from the vehicle, the steering linkage must accommodate free spring action movement of the wheels without loss in steering control such as might occur by loose or sloppy connections between the pitman arm and the wheels. In addition, uniform turning resistance is highly desirable to impart a "feel" of steering control to the driver. Excessive freedom of rotary movement in the steering linkage also enhances wheel shimmy buildup.

Therefore there exists a need for selective control of turning resistance in vehicle steering linkages to tune each individual linkage assembly to an optimum steering characteristic as well as to vary the resistance to turning movement as wear develops or as different steering preferences are requested by the individual driver.

This invention now provides a steering linkage which can be "tuned" as desired by the driver or to meet different driving and different wear conditions and patterns.

It is then an object of this invention to provide a vehicle steering linkage which can be selectively tuned or adjusted.

Another object of this invention is to provide an adjustable idler arm control for selective variation of turning resistance in a parallelogram type of steering linkage.

A further object of this invention is to provide an adjustable idler arm to control turning resistance in a vehicle steering linkage.

A specific object of the invention is to provide an adjustable pin joint for a steering linkage idler arm which has an adjusting screw to vary turning resistance.

A further specific object of this invention is to provide a pin joint with an adjustable axial load screw to control turning resistance of the pin while accommodating limited tilting movement of the pin.

Another object of this invention is to provide an idler arm for a steering linkage with an adjustable pin joint at the inboard end thereof.

Other and further objects of this invention will be apparent to those skilled in the art from the following detailed description of the annexed sheets of drawings which, by way of preferred embodiments only, illustrate two modifications of the invention.

On the drawings:

FIGURE 1 is a somewhat diagrammatic isometric view of an automobile steering linkage including the idler arm of this invention.

FIGURE 2 is a top plan view of the idler arm of FIG. 1.

FIGURE 3 is an elevational view, with parts in vertical cross section, of the idler arm of FIG. 2 taken along the line III—III of FIG. 2.

FIGURE 4 is an exploded vertical cross-sectional view of the pin joint of this invention illustrating the manner in which the components are assembled and also showing an elevation of the frame bracket on which the pin is mounted.

FIGURE 5 is an elevational view, partly in vertical cross-section, of a modified form of idler arm according to this invention.

As shown on the drawings:

In FIG. 1 the reference numeral 10 designates generally a steering linkage for the front wheels 11, 11 of a vehicle. The linkage 10 includes a center or cross-link 12 supported at one end by a pitman arm 13 and at the other end by the idler arm 14 of this invention. Tie rods 15, 15 connect the center link 12 with the steering arms 16, 16 of the wheels 11, 11.

A ball and socket joint assembly 17 connects one end of the center link 12 with the swinging end of the pitman arm 13. The opposite end of the pitman arm is splined to stud 18 depending from the pinion gear of the conventional steering box (not shown).

The opposite end of the center link 12 has an eye 19 receiving the stud of a joint 20 on the outboard end of the idler arm 14. The opposite end of the idler arm is equipped with a joint 21 having its stud affixed to a bracket 22 carried by the frame (not shown) of the vehicle.

Between the joint 17 and the eye 19 the center link has a pair of eye bosses 22, 22 receiving the studs of ball joints 23 on the inboard ends of the tie rods 15, 15. The outboard ends of these tie rods have similar ball joints 24, 24 connected to the steering arms 16, 16.

When the stud 18 rotates, the pitman arm 13 swings about the axis of the stud to shift the center link 12 endwise or longitudinally. This movement is accommodated by swinging of the idler arm 14 relative to the frame bracket 22. The shifting of the center link 12 shifts the tie rods 15, 15 to pull or push the steering arms 16, 16 causing the same to rotate the wheels 11, 11 about their steering knuckle axis.

As best shown in FIGS. 2 and 3 the idler arm 14 has enlarged bosses 25 and 26 on opposite ends thereof connected by a rod-like body 27 which is somewhat inclined so that the boss 26 is at a higher level than the boss 25. These bosses form the housings for the joints 20 and 21.

The components of the joints 20 and 21 are identical and are as shown for the joint 21 in FIGS. 3 and 4. However, the bosses 25 and 26 are oppositely oriented with the boss 25 converging toward the bottom of the arm 14 and the boss 26 converging toward the top of the arm 14 so that the respective studs of the joints 20 and 21 extend in opposite directions to respectively receive the eye 19 of the cross-link 12 and the fixed frame bracket 22. Each boss has a grease plug 28 threaded therein as shown in FIG. 2 so that the interior of each joint can be packed with lubricant as desired, although it is intended that the joints of this invention, after being initially packed with lubricant, will not require relubrication during their normal life. Thus the joints are of the "greased-for-life" type.

As shown in FIGS. 3 and 4 the boss 26 has a conical internal bore 29 converging from a cylindrical counterbore 30 at the bottom end thereof to an inturned annular shoulder 31 at the top thereof. This internal shoulder 31 extends to a circular opening 32 through the top of the boss.

The counterbore 30 provides a flat shoulder 33 receiving thereagainst a closure disk 34 which snugly fits in the counterbore 30 and is held therein by spinning the bottom edge of the boss over the peripheral margin of the disk 34 to provide a retaining shoulder 35 underlying the disk as shown in FIG. 3.

The closure disk 34 has a central thickened head portion 36 and has a threaded hole 37 therethrough receiving in threaded engagemnet an adjusting plug 38 which is threaded along its length and has a bell mouth shape or conical recess 39 in the inner end thereof and a screwdriver slot 40 in the outer end thereof.

A jam nut 41 is threaded on the plug 39 to be bottomed against the head 36 of the closure disk 34 for locking the plug against rotation and in a preselected desired axial position.

A resilient bushing 42 composed of a suitable elastomer such as rubber is mounted in the bore 29 of the boss 26 and has a conical outer wall 43 mating with the bore wall 29.

The converging end of the bushing 42 has a reduced diameter cylindrical collar portion 44 extending from a flat radial shoulder 45. A cylindrical bore 46 extends axially through the bushing 42.

The collar 44 receives therearound a plastic washer 47 preferably composed of a relatively rigid plastic material capable of some deformation under load, such as nylon, polytetrafluoroethylene ("Teflon") and the like are generally useful. "Zytel," a DuPont nylon, has been found to be particularly effective.

The washer 47 has a central aperture 48 of the same diameter as the bore 46, a counterbore 49 fitting the collar 44 and a flat shoulder 50 between the counterbore and aperture which is seated on the end face of the bushing 42.

The external periphery 51 of the washer is generally conical to snugly fit the small end of the bore 29 with the top face of the washer bottomed on the shoulder 31 as shown in FIG. 3. However this periphery 51 is beveled or chamfered at 52 around the top edge of the washer to provide a gap between the washer and the bore 29 for a purpose to be further described.

The bore 46 of the bushing 42 and the aperture 48 of the washer 47 receive therethrough in snug engagement therewith a plastic sleeve 53 preferably composed of a lubricating type of plastic such as nylon, Teflon, or the like. The sleeve 53 has an outturned radial flange 54 at one end thereof and a tapered relatively sharp edge 55 at the other end thereof. The flange 54 underlies the large end of the bushing 42 but has a slightly smaller diameter than this large end so as to be inwardly spaced from the bore 29 as shown in FIG. 3. The tapered edge 55 of the sleeve projects beyond the opening 32 of the boss 26.

A metal stud or pin 56 has a cylindrical shank portion 57 seated in the sleeve 53 with an enlarged head 58 providing a flat shoulder 59 engaging the flange 54 of the sleeve. The head also has a diameter smaller than the large end of the bushing 42 to be spaced from the bore 29 as shown in FIG. 3. The bottom of the head has a bell shaped or conical projection 60 which also may be termed a head portion, fitting the recess 39 in friction engagement with the walls of the recess but adapted to slightly tilt relative to the plug 38. The shank 57 of the stud has a frusto conical portion 61 converging to a reduced diameter threaded end 62. The tapered portion 61 has its large end substantially flush with the sharp edge 55 of the sleeve and receives at the rubber washer or dust seal 63 snugly therearound. This washer tightly embraces the tapered edge 55 of the sleeve and is bottomed on the boss 26 to seal the aperture 32.

The plug 38 is tightened against the projection 60 of the stud sufficient to hold the shoulder 59 against the flange 54 and in turn to press this flange against the bottom of the elastomeric bushing 42. The axial load imparted to the stud 56 by the adjusting plug 38 will control the resistance to rotation of the stud in the sleeve 53 and the elastomeric bushing will retain this load.

As described above the washer 47 has the chamfered portion 52 providing a gap at the shoulder 31. This gap will accommodate slight deformation of the washer 47 in the event the stud 56 is subjected to heavy tilting loads. As pointed out above the flange 54 and the head 58 are spaced from the bore 29 and the projection 60 can tilt slightly in the plug 38 so that some angulation of the pin or stud is accommodated without breaking the parts. Normally however the joint 21 is a pin joint for accommodating rotation only while holding the idler arm for such rotation about a fixed axis.

The tapered portion 61 of the stud is wedge fitted in an aperture 22a provided by the bracket 22 and a locking nut 64 is threaded on the end 62 of the stud which projects above a boss 22b provided on the bracket 22 around the aperture 22a to wedge lock the stud and bracket together. Therefore the stud is fixed in a generally vertical plane on the bracket 22 and the idler arm rotates about this fixed axis of the stud or pin.

In the embodiment of FIGS. 1 to 4, as pointed out above, the joints 20 and 21 are identical except that they are rotated 180° and the stud 56 of the joint 20 therefore projects from the bottom of the boss 25 to have its tapered portion 61 wedge fitted in the eye 19 of the link 18 and held in the eye by the locking nut 64. Therefore the outboard or swinging end of the idler arm 14 also has a pin or stud locked in an aperture through which it projects to be affixed to the center link 12.

In the embodiment of FIG. 5 however the idler arm 14a only has the pin joint 21 at the inboard or bracket end 22. The swinging end of this idler arm 14a is equipped with a different type of a joint and for this purpose carries a ball stud 65 with the ball end 66 thereof adapted to be tiltable and rotatably seated in a joint housing (not shown) provided on the end of the center link 12. It will therefore be understood that the idler arm of this invention need only include one adjustable pin joint of this invention and while the pin joint is preferably at the inboard or bracket mounted end of the idler arm, it could be provided at the outboard end and still impart a desired turning resistance to the linkage. The positioning of the pin joint at the bracket end or inboard end of the idler arm is preferred because it gives a fixed axis of rotation for the idler arm which can accommodate some tilting under abnormal loads and the preset adjustment of the turning resistance at the bracket end of the idler arm can thus be better maintained.

From the above descriptions it should be clearly understood that the invention now provides an idler arm for a steering linkage which makes possible a selected "tuning" of the steering feel and which can be adjusted from time to time to suit conditions.

It will be understood that modifications and variations may be effected without departing from the scope of the novel concepts of the present invention.

I claim as my invention:

1. A parallelogram type steering linkage for vehicles which comprises:
   a cross link,
   a pitman arm operatively connected to said link for shifting the link longitudinally,
   an idler arm remote from said pitman arm,
   a vehicle carried bracket for said idler arm,
   joints including housings at the ends of said idler arm respectively connecting the arm with said link and said bracket for relatively swinging movement of the arm to support said link for longitudinal movement,
   one of said joints having a pin with a radial bearing surface and a thrust bearing surface,
   a resilient mounting for said pin,
   and externally accessible means on the housing of said one joint selectively controlling the thrust load on said pin for adjusting the resistance to rotation of said one joint to thereby control the steering resistance of said linkage.

2. A parallelogram type steering linkage for vehicles which comprises:
a vehicle supported bracket,
a pin joint having the pin thereof anchored to said bracket, said pin having a radial bearing surface, a thrust bearing surface and a head portion,
an idler arm having a hollow boss receiving the pin of said pin joint,
bearings in said hollow boss rotatably supporting said pin and accommodating limiting tilting of the pin,
an adjusting plug carried by said boss for frictional engagement with the head portion of said pin,
means accessible form outside said boss for shifting said plug to vary the load on said pin and thereby control the resistance to rotation of said idler arm,
said idler arm having a second joint on the end thereof opposite said pin joint,
a center link carried by said second joint,
a pitman arm connected to said center link for shifting said link longitudinally,
tie rods connected to said center link to transmit shifting movement thereof,
wheel steering arms connected to said tie rods for rotating the wheels of a vehicle,
and said connections between the pitman arm and center link, the center link and tie rods, and the tie rods and steering arms accommodating relative rotation and tilting movements between the connected parts.

3. An idler arm for vehicle steering linkage which comprises:
a rod-like member having hollow bosses on the ends thereof providing joint housings,
pins projecting from said housings,
bearing members mounted in said housings rotatably supporting said pins,
at least one of said pins having a radial shoulder in axial thrust relation with the pin supporting bearing,
threaded plug means engaging said one pin to regulate the axial thrust load thereon and to thereby control the swinging resistance of said idler arm,
and means for locking said plug means.

4. An idler arm for vehicle steering linkages which comprises:
a rod-like body member having oppositely oriented conical bosses on the ends thereof and inclined to position said bosses at different levels,
both of said bosses having conical bores therein with inturned shoulders at the converging end thereof providing reduced diameter openings,
counterbores in the large ends of said conical bosses providing radial shoulders,
closure disks seated in said counterbores against said radial shoulders,
inturned flange portions on said bosses overlying the marginal peripheries of said closure disks to secure the disks to the bosses,
each of said disks having centrally threaded holes therethrough,
plugs threaded through said holes of the closure disks,
jam nuts threaded on said plugs adapted to abut the closure disks,
rubber bushings seated in said conical bores of the bosses having cylindrical bores therethrough and radial faces on the ends thereof,
a bearing sleeve extending through each cylindrical bore of a bushing and having an outturned flange underlying the bushing,
a bearing washer overlying each bushing and surrounding said sleeve,
a joint stud extending through said bearing sleeve having a head portion engaging the outturned flange of the bearing sleeve and said adjusting plug,
a sealing washer snugly embracing said stud seated on each boss to span the opening thereof and embracing each bearing sleeve,
and said adjusting plugs being easily accessible from outside said bosses to control the thrust load on said stud and thereby regulate the rotation resistance of a steering linkage embodying said idler arm.

5. A pin joint which comprises:
a housing having a conical bore therethrough with an inturned shoulder at the small end of the bore defining a reduced diameter opening to the housing and an outturned shoulder at the large end of the bore,
a closure disk held by said housing against said abutment shoulder to close the large end of the bore,
an adjustment plug threaded through said closure disk,
an elastomeric conical bushing seated is said conical bore in snug engagement with the housing,
said bushing having a reduced diameter cylindrical collar portion at the small end thereof and a radial face at the large end thereof,
a bearing sleeve extending through said bushing having an outturned flange overlying said radial face of the bushing,
a relatively rigid but deformable plastic washer surrounding said sleeve seated on said collar portion of the bushing and bottomed on said inturned shoulder of the housing,
a stud having a head portion engaging said outturned flange of the bearing sleeve,
a cylindrical stud portion extending through the sleeve in rotatable engagement therewith,
and a projecting stud end portion engaging said adjustment plug,
and means accessible from outside said housing bore shifting said adjustment plug relative to the closure disk to thereby control the thrust load on said stud and regulate the turning resistance of the joint.

6. A pin joint which comprises:
a housing,
a stud projecting from the housing,
an elastomeric bushing seated in said housing,
a bearing liner in said bushing rotatably supporting the stud,
an outturned flange on said liner underlying one end of the bushing,
a plastic washer overlying the opposite end of the bushing and receiving the bearing sleeve therethrough.
said stud having a head engaging said outturned portion of the bearing sleeve,
said stud having a projection depending from said head,
a closure member for the end of the housing remote from the end through which the stud extends,
an adjustment plug threaded through said closure disk engaging said projecting portion of the stud, and
means for locking said adjustment plug in a desired axial position relative to said closure disk for maintaining a desired thrust load on said stud to thereby control the rotation resistance of the pin joint.

7. A pin joint with steering linkages and the like which comprises:
a housing having a conical bore therethrough with an inturned shoulder at the small end thereof and an outturned shoulder at the large end thereof,
a closure disk secured against said outturned shoulder for closing the large end of the bore,
an adjustment plug threaded through said closure disk,
a stud projecting from said housing through the small end of the bore,
a bearing sleeve rotatably supporting said stud,
an elastomeric bushing mounting said sleeve in said bore,
a plastic washer surrounding said sleeve and overlying said elastomeric bushing in thrust engagement with said inturned shoulder, said bearing sleeve having an outturned flange underlying the large end of said bushing,
said stud having a head engaging said outturned flange of the bearing sleeve in bearing relation therewith,
said washer and said outturned flange confining said elastomeric bushing therebetween in said conical bore,
and said stud having a head portion engageable with said adjustment plug whereby the thrust load on said stud is controlled by said plug,
and said washer on said elastomeric bushing being deformable under heavy load to accommodate tilting of the stud.

8. A steering resistance controlling idler arm for automotive linkages which comprises:
an arm,
a housing on one end of said arm,
a bearing in said housing,
a pin supported by said bearing for rotation therein and projecting from said housing, said pin having a radial bearing surface, a thrust bearing surface and a head portion,
an axial thrust load applying member adjustably carried by said housing and engaging said pin head portion,
means accessible from outside of said housing for adjusting said load applying member to vary the load on said pin and thereby control the resistance to relative movement between the pin and housing,
and means for locking said load applying member in selected adjusted positions on said housing.

9. An idler arm which comprises:
a rigid elongated body having bosses on the ends thereof,
pin joints mounted in said bosses,
each of said joints having an elongated pin extending from the bosses for connection to steerage linkage parts and substantially restricted in motion to rotation about their longitudinal axes,
at least one of said pin joints having an adjustable plug carried by its respective boss for frictionally engaging the pin thereof only axially thereof,
said plug being accessible from outside of said idler arm to control the resistance to rotation of the pin and thereby regulate the steering resistance of linkage connected to said idler arm, said pin having a radial bearing surface, a thrust bearing surface and a head portion, said plug engaging the head portion of said pin.

References Cited in the file of this patent
UNITED STATES PATENTS

| | | |
|---|---|---|
| 2,544,582 | Booth | Mar. 6, 1951 |
| 2,621,950 | Ricks | Dec. 16, 1952 |
| 2,631,864 | Dick et al. | Mar. 17, 1953 |
| 2,642,318 | Ricks | June 16, 1953 |
| 2,797,929 | Herbenar | July 2, 1957 |
| 2,827,303 | Herbenar | Mar. 18, 1958 |
| 2,835,521 | White | May 20, 1958 |
| 2,954,993 | Scheublein | Oct. 4, 1960 |
| 3,007,729 | Carlson | Nov. 7, 1961 |
| 3,044,798 | Gerner | July 17, 1962 |

FOREIGN PATENTS

| | | |
|---|---|---|
| 698,473 | Great Britain | Oct. 14, 1953 |